United States Patent
Weinstein et al.

(10) Patent No.: US 6,604,242 B1
(45) Date of Patent: Aug. 5, 2003

(54) COMBINING TELEVISION BROADCAST AND PERSONALIZED/INTERACTIVE INFORMATION

(75) Inventors: Steven Weinstein, Palo Alto, CA (US); James E. Palmer, Redwood City, CA (US); Tyler M. Johnson, Piedmont, CA (US); James R. Fulker, Palo Alto, CA (US); Geoffrey A. Katz, San Francisco, CA (US); Mark A. Vickers, Belmont, CA (US); Chee Yu, Dublin, CA (US)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/081,488

(22) Filed: May 18, 1998

(51) Int. Cl.[7] .............................................. H04N 7/173
(52) U.S. Cl. ..................................... 725/109; 725/37
(58) Field of Search ................................. 725/109, 110, 725/111, 112, 113, 46, 34, 35, 37; 348/563, 565, 46; H04N 7/173, 5/445

(56) References Cited

U.S. PATENT DOCUMENTS

| | | |
|---|---|---|
| 4,035,835 A | 7/1977 | Poetsch |
| 5,155,847 A | 10/1992 | Kirouac et al. |
| 5,373,561 A | 12/1994 | Haber et al. ................. 380/49 |
| 5,436,673 A | 7/1995 | Bachmann |
| 5,444,861 A | 8/1995 | Adamec et al. |
| 5,453,779 A | 9/1995 | Dan et al. ...................... 348/7 |
| 5,495,610 A | 2/1996 | Shing et al. |
| 5,497,422 A | 3/1996 | Tysen et al. ................. 380/25 |
| 5,541,638 A | 7/1996 | Story ............................ 348/7 |
| 5,583,560 A | 12/1996 | Florin et al. |
| 5,585,858 A | 12/1996 | Harper et al. |
| 5,594,509 A | 1/1997 | Florin et al. |
| 5,600,364 A | 2/1997 | Hendricks et al. ............. 348/1 |
| 5,621,456 A | 4/1997 | Florin et al. |
| 5,634,051 A | 5/1997 | Thomson ......................... 707/5 |
| 5,654,748 A * | 8/1997 | Mathews ...................... 725/40 |
| 5,680,458 A | 10/1997 | Spelman et al. |
| 5,708,845 A | 1/1998 | Wistendahl et al. .......... 345/302 |
| 5,727,129 A | 3/1998 | Barrett et al. ........... 395/200.47 |
| 5,752,042 A | 5/1998 | Cole et al. |
| 5,754,938 A | 5/1998 | Herz et al. .............. 395/200.49 |
| 5,754,939 A | 5/1998 | Hertz et al. .................. 455/4.2 |
| 5,761,306 A | 6/1998 | Lewis ........................... 380/21 |
| 5,764,992 A | 6/1998 | Kullick et al. |
| 5,787,172 A | 7/1998 | Arnold .......................... 380/21 |
| 5,796,840 A | 8/1998 | Davis ........................... 380/50 |
| 5,801,787 A * | 9/1998 | Schein et al. ................. 348/569 |
| 5,802,284 A | 9/1998 | Karlton et al. |
| 5,808,628 A | 9/1998 | Hinson |
| 5,809,287 A | 9/1998 | Stupeck, Jr. et al. |
| 5,850,232 A | 12/1998 | Engstrom et al. ............ 345/511 |
| 5,859,969 A | 1/1999 | Oki et al. |
| 5,867,166 A | 2/1999 | Myhrvold |
| 5,870,765 A | 2/1999 | Bauer et al. ................. 707/203 |
| 5,874,967 A | 2/1999 | West et al. .................. 345/435 |

(List continued on next page.)

OTHER PUBLICATIONS

Howard E. Bussey et al., "Service Architecture, Prototype Description, and Network Implications of a Personalized Information Grazing Service," Multiple Facets of Integration, San Francisco, Jun. 3–7, 1990, Institute of Electrical and Electronic Engineers, pp. 1046–1053 (XP000164339).

(List continued on next page.)

*Primary Examiner*—Chris Grant

(57) ABSTRACT

The invention provides an improved method and system for interactive broadcast and web information browsing. In embodiments of the invention, web information is presented in conjunction with a broadcast television image, either at an edge of the image screen or overlaid with the image screen in an opaque, transparent or translucent image. The presented web information is fully interactive and can be interacted with by the user using all known features of interactive web presentation.

34 Claims, 4 Drawing Sheets

U.S. PATENT DOCUMENTS

| | | | | |
|---|---|---|---|---|
| 5,877,741 A | | 3/1999 | Chee et al. | 345/113 |
| 5,887,243 A | | 3/1999 | Harvey et al. | |
| 5,926,624 A | | 7/1999 | Katz et al. | |
| 5,929,849 A | * | 7/1999 | Kikinis | 725/113 |
| 5,936,606 A | | 8/1999 | Lie | 345/113 |
| 5,977,960 A | | 11/1999 | Nally et al. | 345/191 |
| 6,005,574 A | | 12/1999 | Herrod | 345/344 |
| 6,009,363 A | | 12/1999 | Beckert et al. | 701/33 |
| 6,018,768 A | | 1/2000 | Ullman et al. | 709/218 |
| 6,028,583 A | | 2/2000 | Hamburg | 345/112 |
| 6,028,600 A | * | 2/2000 | Rosin et al. | 345/327 |
| 6,047,269 A | | 4/2000 | Biffar | 705/39 |
| 6,049,628 A | | 4/2000 | Chen | |
| 6,049,835 A | | 4/2000 | Gagnon | 709/245 |
| 6,064,376 A | * | 5/2000 | Berezowski et al. | 725/42 |
| 6,073,119 A | * | 6/2000 | Bornemisza-Wahr et al. | 705/42 |
| 6,104,727 A | | 8/2000 | Moura et al. | 370/468 |
| 6,240,555 B1 | * | 5/2001 | Shoff et al. | 725/110 |
| 6,263,501 B1 | * | 7/2001 | Schein et al. | 725/39 |
| 6,459,427 B1 | * | 10/2002 | Mao et al. | 725/112 |

OTHER PUBLICATIONS

Rosenfeld L B, et al: "Automated Filtering Of Internet Postings" Online, vol. 18, No. 3, May 1994, pp. 27–30, XP000616769 see the whole document.

Yan T W, et al: "Sift—A Tool For Wide–Area Information Dissemination" Usenix Technical Conference, Jan. 16, 1995, pp. 177–186, XP000617276 see the whole document.

Bussey H E et al: "Service Architecture, Prototype Description, And Network Implications Of A Personalized Information Grazing Service" Multiple Facets Of Integration,San Francisco,Jun. 3–7,1990 Institute Of Electrical And Electronic Engineers, pp. 1046–1053, XP000164339 see whole document.

Wyle M F: "A Wide Area Network Information Filter" Proceedings International Conference Artificial Intelligence On Wall Street, Oct. 9, 1991, pp. 10–15, XP000534152 see the whole document.

Lang K: "NewsWeeder: learning to filter netnews" Machine Learning. Proceedings Of The Twelfth International Conference On Machine Learning, Tahoe City, CA, USA, Jul. 9–12, 1995, San Francisco, CA, USA, Morgan Kaufman Publishers, USA, pp. 331–339, XP002046557 see the whole document.

* cited by examiner

COMBINING TELEVISION BROADCAST AND PERSONALIZED/INTERACTIVE INFORMATION

CROSS-REFERENCE TO RELATED APPLICATIONS

This application claims priority of the following applications:

application Ser. No. 08/770,238, filed Dec. 20, 1996, in the name of inventors Wei Yen and Steven Weinstein, titled "Internet Multiplexer for Broadcast and Other Information";

Provisional Application Serial No. 60/047,809, filed May 16, 1997, in the name of inventors Steven Weinstein, James Palmer, James Fulker and Jeffrey Mock, titled "User Interface,".

Each of these applications is hereby incorporated by reference as if fully set forth herein. These applications are collectively referred to herein as the "Navio Disclosures."

BACKGROUND OF THE INVENTION

1. Field of the Invention

The invention relates to a system for combining interactive broadcast and web information browser.

As used herein, the term "broadcast" includes wide variations on the theme of broadcast, including cablecast, narrowcast, network multicast, "push" technology, and other variations of simultaneous information distribution to a plurality of recipients.

As used herein, the term "interactive" includes wide variations on the theme of interactivity and personalization, including both of the following:

interactive systems in which a recipient of information has a transmission channel by which to express preferences or to request information of a specific type; and personalized systems in which a recipient of information can select among a plurality of simultaneously distributed sets of information, in which the particular information presented to the recipient is responsive to individual or personal preferences or selections (instead of the information being identically presented to a mass audience).

As used herein, the term "personalized" also includes wide variations on the theme of interactivity and personalization, similar to those encompassed within the term "interactive." Information distribution referred to herein as "interactive" also includes the many concepts of personalization; information distribution referred to herein as "personalized" also includes the many concepts of interactivity.

As used herein, the terms "web," "HTML," and "embedded information" also include wide variations on the theme of information provided by a server and including links or hyperlinks to other information. For example, other internet information retrieval protocols, such as electronic mail, file transfer, gopher, IRC, telnet, are within the scope and spirit of the invention, and should be considered at each use of the term "web." Moreover, other information formats, including SGML, XML, and graphical document formats or word processor formats that allow for linking or hyperlinking, are also within the scope and spirit of the invention, and should be considered at each use of the terms "HTML" or "embedded."

2. Related Art

Known information distribution systems include broadcast media, such as radio and television, and interactive media, such as telephone systems and electronic mail. Recent computer systems include the World Wide Web (the "web"), which is interactive in that users, using web clients, can request information from web servers, and after receiving that information can display or present it for review. Information available using the web includes text, graphics, pictures, sound, animation, and programs or program applets such as Java or JavaScript.

Many users would like to receive both broadcast information and interactive (or personalized) information in a unified interface, whether or not that unified interface has a return transmission channel by which to express preferences or to request information. It would be advantageous for the unified interface to combine both the broadcast and interactive (or personalization) features, that is, to allow the user to interact with and personalize broadcast information, and to receive interactive or personalized information without closely and actively requesting it. It would also be advantageous for the unified interface to simultaneously present both broadcast information, and interactive or personalized information, without either interfering with the other.

One problem in the known art is that broadcast television signals are designed for presentation over the entire screen of a television monitor, while web pages (and other interactive or personalized content) are also designed for presentation over the entire screen, or at least most of the entire screen. Since there is only a finite amount of screen space for presentation of visual material, this problem makes it difficult for the user to simultaneously receive and present both broadcast information and interactive or personalized information, as each tends to interfere with the other.

A first method in the known art is to reserve a separate mode on an otherwise ordinary television set for presentation of web information. In this known method, the user selects the separate mode for presentation of web information, and selects television channels (and deselects the separate mode) for presentation of broadcast television information. While this known method achieves the presentation of both broadcast and interactive information, it has the drawback that both kinds of information are not presented simultaneously, and the user does not achieve the advantage of simultaneously using both the broadcast and interactive models of receiving information.

A second method in the known art is to use a "picture-in-picture" feature of broadcast television receivers to present a relatively smaller version of a broadcast television picture while simultaneously presenting web information (or other broadcast television information) to the user. While this known method achieves the presentation of both broadcast and interactive information, it has the drawback that at least some of the interactive information is covered up by the picture-in-picture feature, and thus is not readily viewable by the user.

A third method in the known art is to present raw text, selected from an out-of-band part of the television signal such as the VBI (vertical blanking interval) in a reserved section of the television display. This known method is used for "closed caption" television subtitles. However, this known method only achieves the presentation of broadcast information, as the subtitles are not subject to interactive use by the user. Moreover, this known method is limited to presentation of only simple information, such as raw text and some rudimentary block graphics; it is also opaque and interferes with display of the broadcast television signal. This simple information is supplied by the broadcaster for all recipient devices, and is neither interactive nor personalized.

Accordingly, it would be desirable to provide an improved method and system for combining television broadcast and personalized/interactive information. This advantage is achieved in embodiments of the invention in which personalized or interactive graphical information is presented in conjunction with a broadcast television image, either at an edge of the image screen or overlaid with the image screen in an opaque, transparent, translucent, or at least partially transparent or translucent, image. The presented web information is fully interactive or personalized, and can be interacted with, and personalized, by the user using all known features of interactive or personalized web presentation.

SUMMARY OF THE INVENTION

The invention provides an improved method and system for combining television broadcast and personalized/interactive information. In embodiments of the invention, personalized or interactive graphical information (such as web information) is presented in conjunction with a broadcast television image, either at an edge of the image screen or overlaid with the image screen in an opaque, transparent, translucent, or at least partially transparent or translucent, image. The presented web information is fully interactive or personalized, and can be interacted with, and personalized, by the user using all known features of interactive or personalized web presentation.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, or other special purpose circuits, and that implementation of the preferred process steps and data structures described herein using such equipment would not require undue experimentation or further invention.

System Elements

Figure 1:
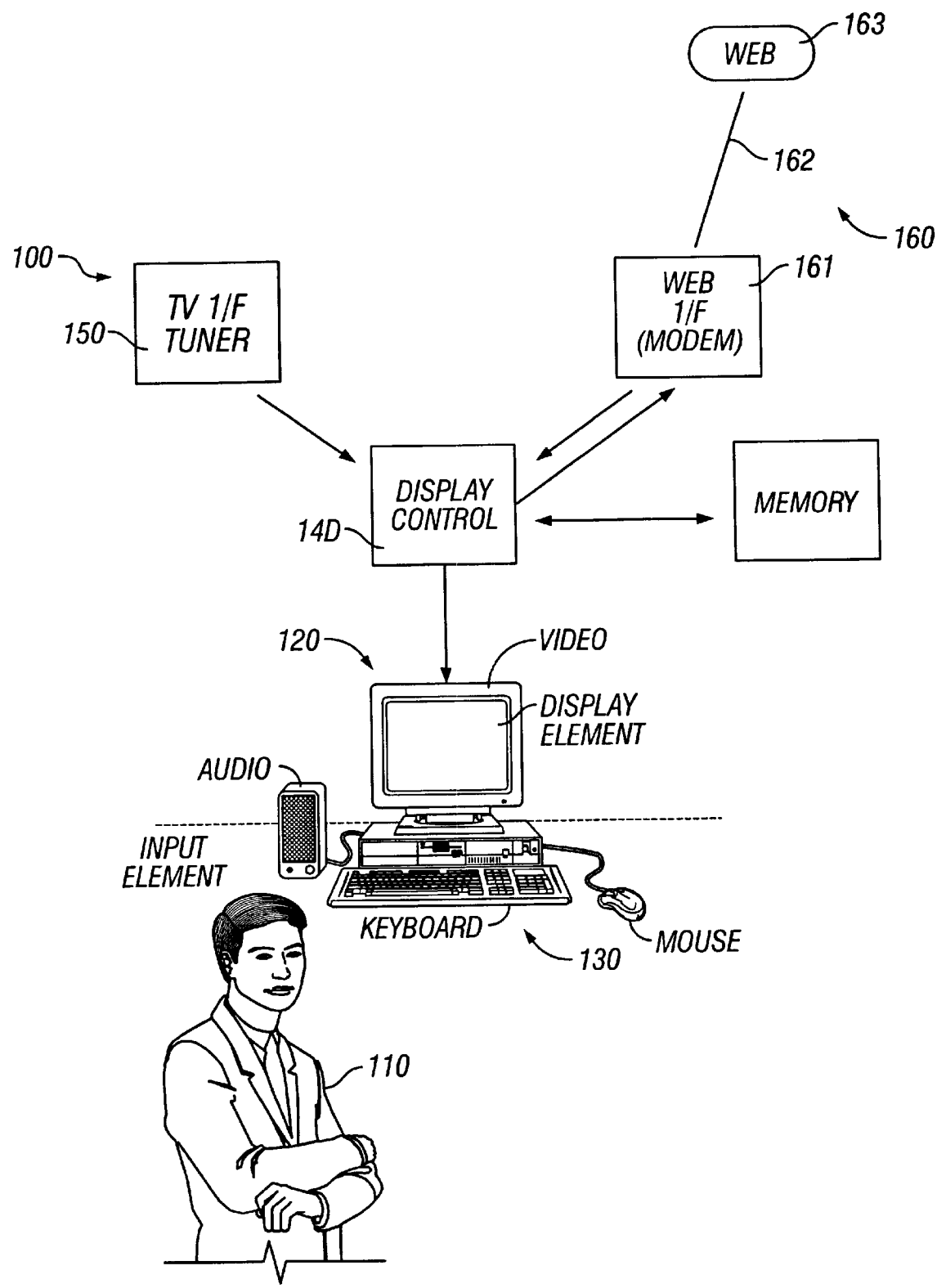
FIG. 1 shows a block diagram of a system for combining television broadcast and personalized/interactive information.
Figure 2A:
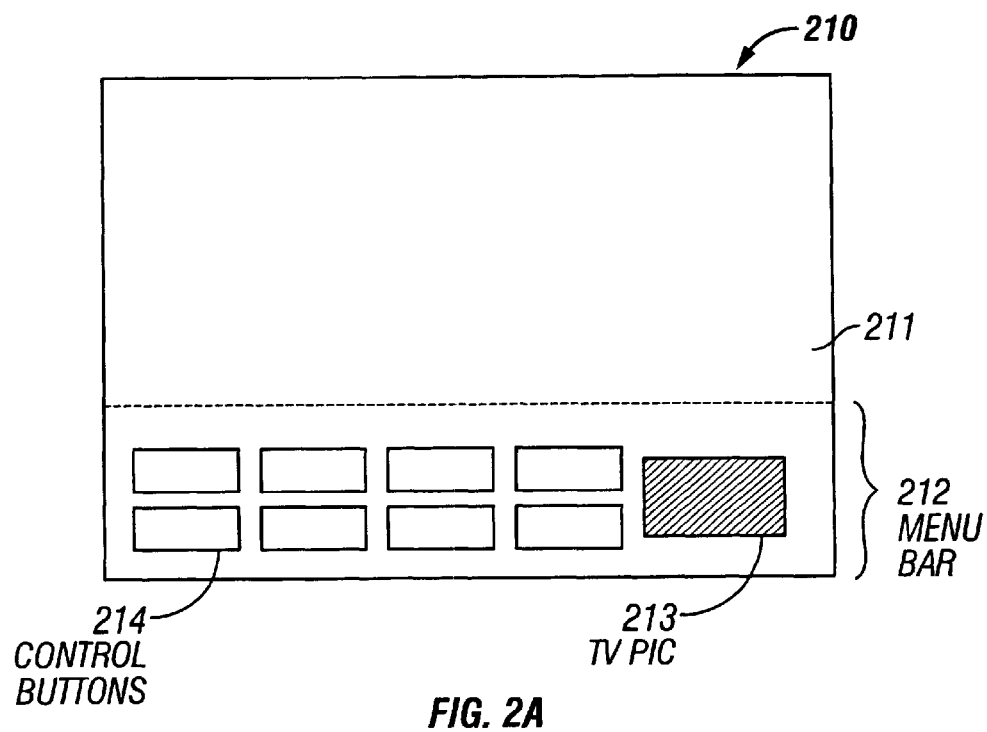
FIG. 2 (including panels 2A, 2B, 2C, and 2D) shows a set of diagrams of screens for displaying television broadcast and personalized/interactive information in combination.
Figure 2B:
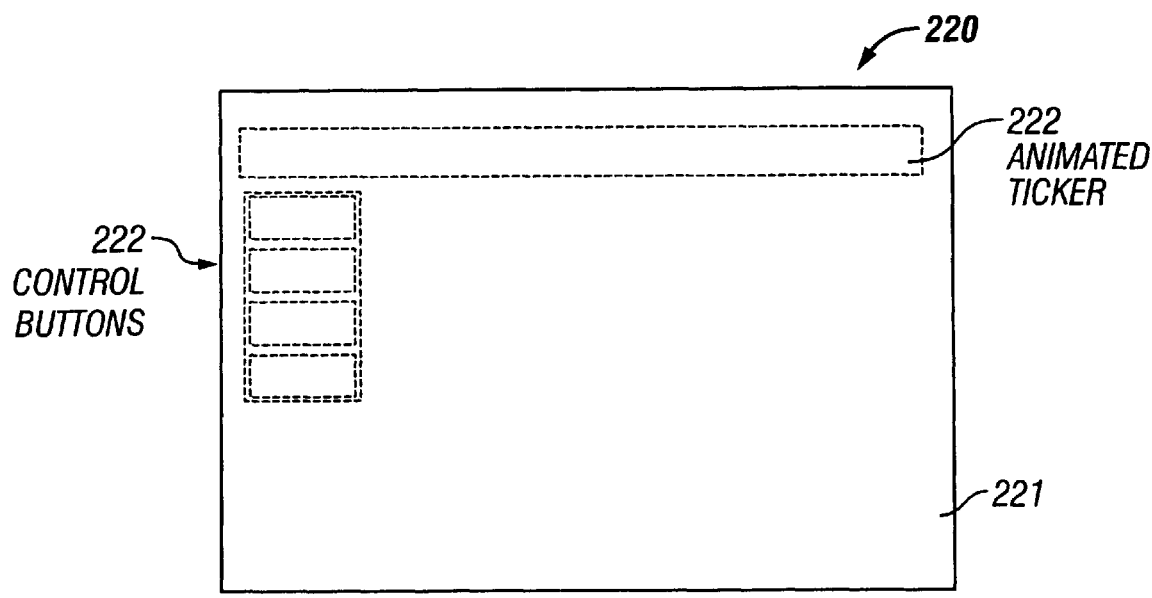
Figure 2C:
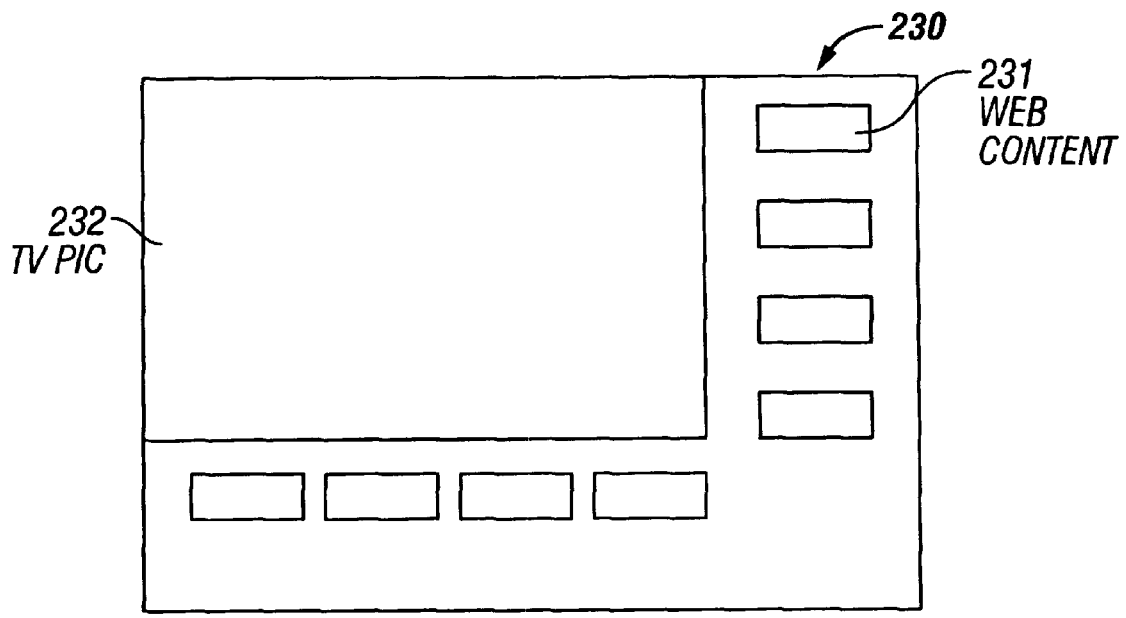
Figure 2D:
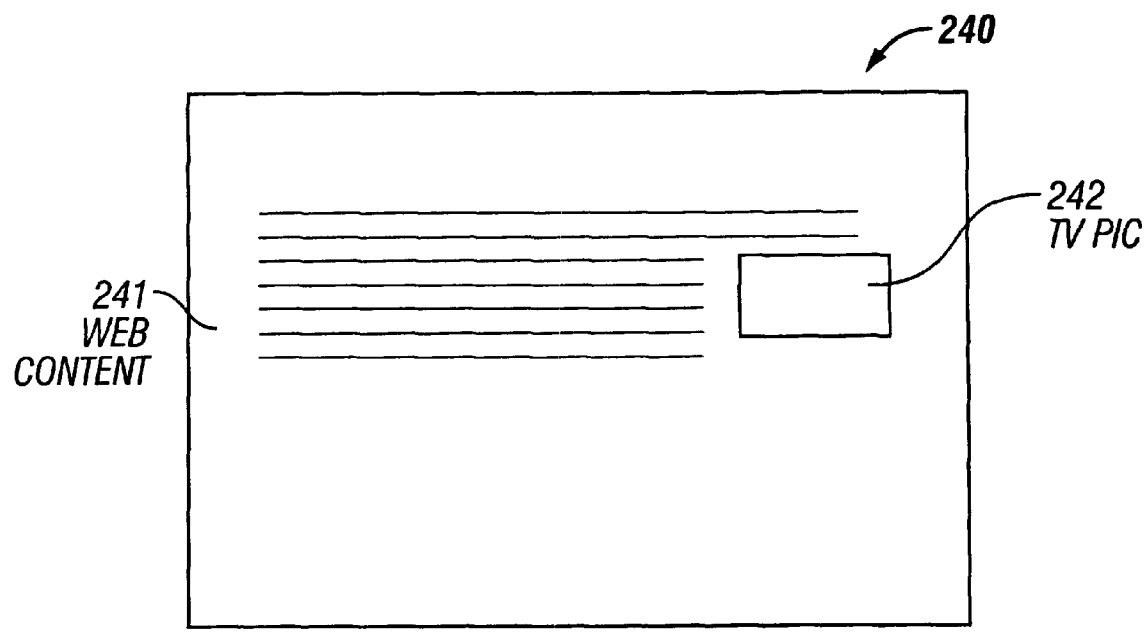

FIG. 1 shows a block diagram of a system for combining television broadcast and personalized/interactive information.

A system 100 for combining television broadcast and personalized/interactive information includes the following elements:

one or more individual recipients 110 who receive information, and who can interactively select information to receive or personalize the information they receive;

a display element 120 disposed for displaying information to one or more individual recipients 110;

an input element 130 disposed for receiving choices or other information from the individual recipients 110;

a display controller 140 disposed for selecting information to be distributed to the individual recipients 110, and for controlling distribution of that information to the display element 120;

a broadcast information interface 150 disposed for receiving broadcast information and decoding or demodulating that broadcast information for use by the display controller 140; and an interactive information interface 160 disposed for receiving interactive or personalized information and transmitting that interactive or personalized information to the display controller 140.

In a preferred embodiment, the individual recipients 110 comprise individual users, and can be distinguished by the system 100 by requiring one or more of them to login or to otherwise identify themselves.

In alternative embodiments, the individual recipients 110 may include devices that maintain information about individual user preferences, and which interact with the system 100 to make the system 100 responsive to those preferences. For example, the individual recipients 110 may include electronic devices such as cellular telephones, pagers, or personal electronic notebooks, which record user preferences and interact with the system 100.

The display element 120 includes a television monitor 121 and a speaker 122. The television monitor 121 is disposed for displaying still picture and motion picture information for viewing by the users. Similarly, the speaker 122 is disposed for presenting audio information to the users, and can be packaged with the television monitor 121 as part of a television set, or can be packaged as a set of headphones for one or more users.

The input element 130 can include a keyboard 131, such as an alphanumeric keyboard, and a pointing device 132, such as a mouse, trackball, or joystick.

In a preferred embodiment, the keyboard 131 comprises a special-purpose keyboard adapted to the techniques described herein, including buttons disposed for directing the display controller 140 to move a cursor displayed on the television monitor 121, and buttons disposed for selecting an item indicated by the cursor. For example, the keyboard 131 can comprise a television remote control. The keyboard 131 and its operation can be such as described in the Navio Disclosures.

The display controller 140 includes a processor, program and data memory for executing operating system and application programs, and storage for storing and retrieving one or more sets of user preferences.

In a preferred embodiment, the broadcast information interface 150 includes a television tuner, disposed for control by the display controller 140.

In alternative embodiments, the broadcast information interface 150 may include, either in addition or instead, other devices for receiving broadcast information (as that term is used broadly herein), such as a cable television receiver, a satellite receiver, a video-cassette player/recorder, or other known transducers for pre-selected information generally distributed en masse.

The interactive information interface 160 includes a communication link 161 to an information server 162. For example, in a preferred embodiment, the interactive information interface 160 includes a modem 163 disposed for coupling using an ISP (internet service provider) to at least one selected server on the internet (or more specifically, the web).

In alternative embodiments, there is no special requirement that the interactive information interface 160 be included in the system 100. As described herein, the broadcast information interface 150 may provide information in multiple streams, of which one or more such streams may be selected by the individual recipients 110 for display.

Nature of Display

FIG. 2 (including panels 2A, 2B, 2C, and 2D) shows a set of diagrams of screens for displaying television broadcast and personalized/interactive information in combination.

Menu Bar

A first panel 2A shows a screen 210 having a first region 211 for display of broadcast information or web information and a second region 212 for display of a menu bar.

In the first panel 2A, the second region 212 is for display of a menu bar, comprising a selected set of graphical and text objects for display at the request of the individual recipients 110.

In a preferred embodiment, the second region 212 includes a first subregion 213 for display of a television signal, and a set of second sub-regions 214 for display of interactive controls. For example, the first sub-region 213 can display a television signal for a selected television channel, to which the broadcast information interface 150 is tuned for reception, even while the individual recipients 110 request and retrieve web information.

The first region 211 can either be obscured, or not obscured, by the appearance of the menu bar, at the selection of the individual recipients 110.

If the individual recipients 110 select that the first region 211 should be obscured, the menu bar overrides the display for its part of the screen 210. If the individual recipients 110 select that the first region 211 should not be obscured, the broadcast information is redisplayed or resized to encompass the information entirely within the first region 211. This can be accomplished by changing an aspect ratio of the broadcast information, or by leaving a portion of the first region 211 blank while not changing any aspect ratio.

In a preferred embodiment, the menu bar in the second region 212 is similar even when the first region 211 is used to display web information. Thus, the individual recipients 110 can have a continuous display of a selected television signal even while requesting and displaying web information.

Control Panel and Ticker

A second panel 2B shows a screen 220 having a first region 221 for display of broadcast information, and a set of second regions 212 for display of web information in an opaque, transparent, translucent, or at least partially transparent or translucent, manner.

In a preferred embodiment, the second panel 2B comprises a model for the default home page that is accessed by most individual recipients 110 upon startup of the system 100 (described in further detail with reference to FIG. 3).

The first region 221 for display of broadcast information is modeled as a web graphic that is transparent, either fully or partially, with a selected television signal designated as a background source. The display controller 140 formats the screen 220 to display the background source, except in the set of second regions 222 where the background graphic is overlaid by one or more translucent or opaque (or at least partially translucent) selected web graphics. These selected web graphics can themselves include television signals.

The set of second regions 222 includes a first subset, including control buttons for selecting preferences or requesting a particular service (such as a selected screen for composing or reviewing electronic mail). The choice of which control elements to display can be responsive to one or more of the following:

preferences set by the individual recipients 110, or implied by their past actions;

selections made by the individual recipients 110 using the control elements themselves; and interactive information made available by the system 100, such as news bulletins or alerts indicating incoming messages.

The set of second regions 222 also includes a second subset, including an animated ticker for continuously displaying information that can be of interest to the individual recipients 110. The choice of what information to display in the animated ticker can be responsive to one or more of the following:

preferences set by the individual recipients 110, or implied by their past actions, operating to filter a sequence of new information; and selections made by the individual recipients 110, including selecting one or more of the ticker elements for further information.

When the individual recipients 110 make selections responsive to the ticker elements, the system 100 responds similarly to any other request for interactive information. For example, each ticker element can include an HTML pointer to a web page or embedded object for further display or processing.

Broadcast Information in a Web Frame

A third panel 2C shows a screen 230 having a first region 231 for display of web information, including a second region 232 for display of broadcast information in a frame of the web page.

In a preferred embodiment, the second region 232 for display of broadcast information includes an entire screen of television signals, either resized but using a same aspect ratio, or resized or not and using a different aspect ratio, to present the entire television signal screen is present without distortion.

The first region 231 for display of web information can include a set of embedded objects, including HTML links to other web objects, which can themselves comprise frames having other selected television signals.

Broadcast Information as a Web Embedded Object

A fourth panel 2D shows a screen 240 having a first region 241 for display of web information, and a second region 242 for display of broadcast information as a designated embedded object of the web page.

The first region 241 for display of web information can include any type of objects that can otherwise be embedded in a web document, including text, graphical objects, animation, program elements, or frames or sub-frames.

The second region 242 for display of broadcast information comprises a section of the web information that includes a graphic whose source is a dynamic and continuous display of a television signal. The particular television signal can be resized and have its aspect ratio altered as well. The particular television signal can be selected in response to a choice by the web information provider, such as by so indicating in an HTML tag, or can be selected in response to a choice by the individual recipients 110. The graphic whose source is a dynamic and continuous display of a television signal can itself be coupled to any web object, such as any personalized element or clickable object.

Method of Operation

Figure 3:
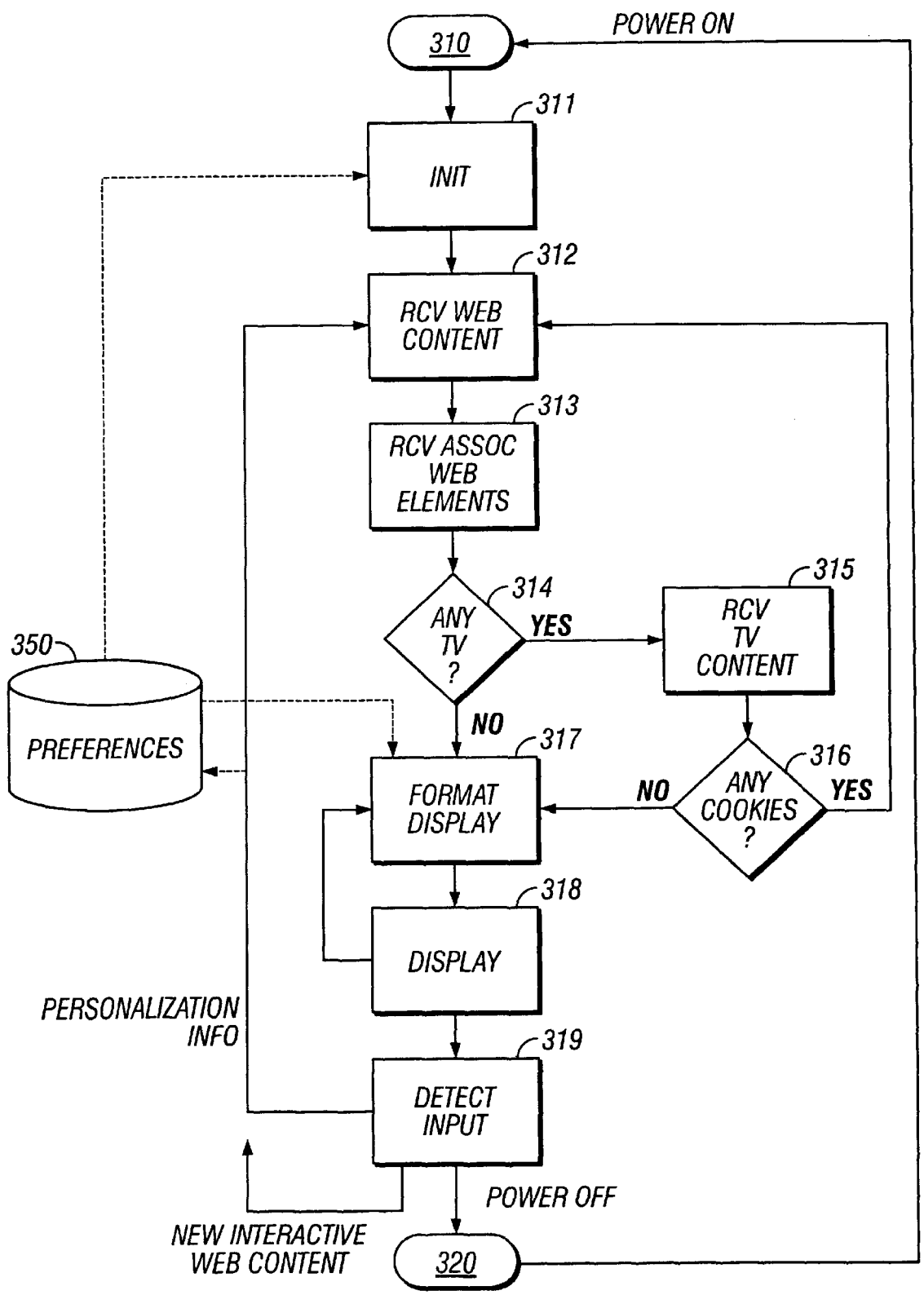
FIG. 3 shows a process flow diagram of a method for combining television broadcast and personalized/interactive information.

FIG. 3 shows a process flow diagram of a method for combining television broadcast and personalized/interactive information.

A method 300 is performed by the system 100, including the display element 120, the input element 130, the display controller 140, the broadcast information interface 150, and the interactive information interface 160. The system 100 is also responsive to input from the individual recipients 110.

At a flow point 310, the system 100 is brought into an initial state, such as by turning the power on or by using a reset switch.

At a step 311, the system 100 performs any required initialization, such as the following:

performing any required power-on self-test or self-authentication;

retrieving any required global information, such as time or location of the system 100;

authenticating the particular individual recipients 110, such as using a login procedure, and retrieving any preferences for those particular individual recipients 110; and selecting a web page, such as an initial page or home page, at which the particular individual recipients 110 can begin receiving web content.

In a preferred embodiment, the system 100 records a location of the home page, and any preferences for retrieving information from that home page, with a set of recorded preferences 350 for the individual recipients 110. For example, the preferences 350 can include a set of parameters for a home page that includes a CGI script or JavaScript program.

At a step 312, the interactive information interface 160 retrieves the selected web page for the individual recipients 110.

At a step 313, the interactive information interface 160 retrieves any other web content associated with the home page.

At a step 314, the system 100 determines if there is any broadcast content included among the web content to be retrieved. If so, the method 300 continues with the step 315. If not, the method 300 continues with the step 317.

In a preferred embodiment, broadcast content can be included among the web content to be retrieved using a URL including "TV://". This new "TV" protocol can be used as either a location or as an image source, and can thus fully link any broadcast television signal into any web page or frame.

For a first example, the "TV" protocol can be used as a top location typed in at a menu bar, in HTML using "tv://3", or in Javascript (using top.location="tv://same").

For a second example, the location can specify a frame in a frameset, in HTML (using <FRAME SRC="tv://3" NAME="tv">), or in Javascript (using top.frame[0].location="tv://3").

For a third example, the location can be specified as the destination of a link, in HTML using the HREF property (using <A HREF="tv://3"></A>).

Thus, the author of a web page or frame can set the entire background of the web page or frame to correspond to a broadcast television signal, or can provide a selected "screen" region in which the broadcast television signal is to be displayed.

For a first example, the following HTML lines each set the background image of the page to correspond to a broadcast television signal:

<BODY BGCOLOR="transparent" BACKGROUND="tv://same/"> (351)

<BODY BGCOLOR="transparent" BACKGROUND="tv://03"> (352)

<BODY BGCOLOR="transparent" BACKGROUND="tv://MTV"> (353)

HTML line 351 sets the background image source to whatever channel the television tuner is then currently set to. HTML line 352 specifically sets the background image source to channel three. HTML line 353 specifically sets the background image source to the channel broadcasting MTV.

For a second example, the following HTML lines include a broadcast television signal as a window in the web page content:

<IMG SRC="tv://same/"> (354)

<IMG SRC="tv://7" width=564 height=204> (355)

<IMG SRC="tv://36"> (356)

<IMG SRC="tv://KPIX"> (357)

HTML line 354 sets the image source to whatever channel the television tuner is then currently set to. HTML line 355 specifically sets the image source to channel seven, with a specified height and width. HTML line 356 specifically sets the image source to channel 36. HTML line 357 specifically sets the image source to the channel broadcasting KPIX.

For a third example, the following HTML lines include a broadcast television signal as a full-screen television window in the web page content:

<A HREF="tv://"></A> (358)

HTML line 358 sets the anchor reference for a window to a broadcast television signal.

At a step 315, the broadcast information interface 150 retrieves the selected broadcast content. For example, if the selected broadcast content includes a selected television signal for video display and audio presentation, the broadcast information interface 150 tunes to the associated television channel for that television signal and retrieves that television signal.

At a step 316, the system 100 determines if any personalized information is included with the broadcast content. For example, the broadcast television signal can include personalized information or other information, such as web browser "cookies," in the VBI or other out-of-band portion of the television signal. The display controller 140 can alter the presentation of the broadcast content, such as for example by selecting a particular camera angle (or otherwise selecting among multiple broadcast channels, sources, or streams), in response to the personalized information. Moreover, the personalized information can direct the system 100 to retrieve different web content; if so, the method 300 returns to the step 312.

In alternative embodiments, the broadcast television signal can include much other information, such as pointers to web content (URLs or embedded web objects), in the VBI or other out-of-band portion of the television signal. The system 100 can use this other information to display options to the individual recipients 110, to alter the preferences 350 for the individual recipients 110, or to otherwise alter its state to enhance the simultaneous presentation of the broadcast content and the (individual or personalized) web content.

At a step 317, the display controller 140 formats the screen for display on the television monitor 121. As part of this step, the display controller 140 integrates the selected broadcast content into the web content for display (and presentation) using the display element 130. In a preferred embodiment, the display controller 140 uses information from the preferences 350 to determine, at least in part, how to integrate the selected television signal into the web content.

At a step 318, the display element 120 displays the screen to the individual recipients 110. After a short period of time, the method 300 returns to the step 317 to reformat and redisplay the screen. For example, if the web content can include animation or a program element, or the broadcast, content can include a motion picture (as it typically will).

At a step 319, the input element 130 detects input from one or more of the individual recipients 110. A wide variety of possible inputs, and consequently a wide variety of possible responses, are within the scope and spirit of the invention. These include at least the following:

The input includes personalization information or otherwise alters preferences for the individual recipients 110. The method 300 returns to the step 312 so that the display controller 140 can retrieve other web content, and consequently reformat and redisplay the screen, in response to the personalization information. The system 100 can also record the personalization information in the preferences 350.

The input selects new selected interactive information. The method 300 returns to the step 312 so that the interactive information interface 160 can retrieve the new selected interactive information, similar to retrieving the home page.

The input turns the system 100 off. The system 100 performs any required termination, and returns to a quiescent state. When the system is next activated, it will return to the flow point 310.

General Applicability of the Invention

Those skilled in the art will recognize, after perusal of this application, that the particular examples shown herein are a few of the many possibilities for combining web content (which can be interactive and personalized) with broadcast content (which can be dynamic and selected from multiple sources).

Any individual web object can have a selected television signal presented for display as an embedded object within the web object, such as a frame or sub-frame, a graphical object, or an object presented using a program element (such as a CGI script or Java or JavaScript program). For example, a web object can be constructed including all or part of many selected television signals for display, so the individual recipients 110 can choose to watch individual television signals according to parameters selected and performed by a web server or application.

Any selected television signal can be presented for display underlying a transparent web object, so that the web object can be presented in conjunction with the television signal without obscuring any significant part of the television signal. Moreover, principles of web design can be used in conjunction with the television signal, so elements of the television signal can be made interactive. For example, a television signal advertisement including a telephone number can have a web object superposed so individual recipients 110 can select the telephone number to call it.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of presenting information, said method including steps for:
   presenting broadcast information;
   simultaneously presenting interactive Web information; and
   storing user preferences;
   wherein said user preferences are used to determine how said broadcast information is presented in relationship to said interactive information and determine content of said interactive information;
   wherein said broadcast information and said interactive information do not substantially obscure each other.

2. A method as in claim 1, wherein said interactive information includes at least one hyperlink to an information source.

3. A method as in claim 1, wherein said interactive information includes at least one hypertext content element.

4. A method as in claim 1, wherein said interactive information includes a plurality of content types.

5. A method as in claim 1, wherein said interactive information includes an animation content element.

6. A method as in claim 1, wherein said interactive information includes a program or script content element.

7. A method as in claim 1, wherein said interactive information includes personalized information.

8. A method as in claim 1, wherein said steps for presenting broadcast information and simultaneously presenting interactive information are performed without obscuring any of said interactive information or said broadcast information.

9. A method as in claim 1, wherein said steps for presenting interactive information include steps for
   receiving interactive inputs related to said information; and
   selecting interactive information to present in response to said interactive inputs.

10. A method as in claim 9, wherein said steps for selecting interactive information include steps for
    transmitting at least one request for information to an information server; and
    receiving information from said information server in response to said request for information.

11. A method of presenting information, said method including steps for:
    presenting broadcast information;
    simultaneously presenting personalized Web information; and
    storing user preferences;
    wherein said user preferences are used to determine how said broadcast information is presented in relationship to said personalized information and determine content of said personalized information;
    wherein said broadcast information and said personalized information do not substantially obscure each other.

12. A method as in claim 11, wherein said personalized information includes at least one hyperlink to an information source.

13. A method as in claim 11, wherein said personalized information includes at least one hypertext content element.

14. A method as in claim 11, wherein said personalized information includes a plurality of content types.

15. A method as in claim 11, wherein said personalized information includes an animation content element.

16. A method as in claim 11, wherein said personalized information includes a program or script content element.

17. A method as in claim 11, wherein said personalized information includes a toolbar, said toolbar being configurable by an operator.

18. A method as in claim 11, wherein said personalized information includes information selected from said broadcast information.

19. A method as in claim 11, wherein said personalized information includes interactive information.

20. A method as in claim 11, wherein said steps for presenting broadcast information include steps for presenting said broadcast information within a web page frame.

21. A method as in claim 11, wherein said steps for presenting broadcast information include steps for presenting said broadcast information within a toolbar, said toolbar being configurable in response to input from an operator.

22. A method as in claim 11, wherein said steps for presenting broadcast information and simultaneously presenting personalized information are performed without obscuring any of said personalized information or said broadcast information.

23. A method as in claim 22, wherein said steps for presenting broadcast information and simultaneously presenting personalized information include steps for presenting said personalized information at an edge of a television screen; and presenting said broadcast information with an altered aspect ratio or size.

24. A method as in claim 22, wherein said steps for presenting broadcast information and simultaneously presenting personalized information include steps for presenting said personalized information overlaid on said broadcast information, said personalized information being presented at least partially translucently or transparently.

25. A method as in claim 22, wherein said steps for presenting personalized information include steps for presenting said personalized information in response to an explicit request from an operator.

26. A method as in claim 22, wherein said steps for presenting personalized information include steps for presenting said personalized information in response to an alert, said alert being responsive to an input from an operator.

27. A method as in claim 11, wherein said steps for presenting personalized information include steps for filtering a sequence of content elements in response to a set of personalization information, said sequence of content elements including at least one non-text content element.

28. A method as in claim 27, including steps for storing a plurality of sets of said personalization information; and selecting one of said plurality of sets in response to an input from an operator.

29. A method as in claim 27, including steps for storing said personalization information in a relatively persistent user profile.

30. A method as in claim 11, wherein said steps for presenting personalized information include steps for receiving interactive inputs related to said information; and selecting personalized information for presentation in response to said interactive inputs.

31. A method as in claim 30, wherein said steps for receiving interactive inputs include steps for receiving a set of explicit personalization information from an operator.

32. A method as in claim 30, wherein said steps for receiving interactive inputs include steps for receiving a set of information requests from an operator; and determining a set of explicit personalization information responsive to said information requests.

33. A method as in claim 30, wherein said steps for selecting personalized information include steps for selecting personalized information from a plurality of streams of information, said plurality of streams not being responsive to said inputs.

34. A method as in claim 30, wherein said steps for selecting personalized information include steps for transmitting at least one request for information to an information server; and receiving information from said information server in response to said request for information.

* * * * *

UNITED STATES PATENT AND TRADEMARK OFFICE
CERTIFICATE OF CORRECTION

PATENT NO. : 6,604,242 B1
DATED : August 5, 2003
INVENTOR(S) : Steven Weinstein et al.

It is certified that error appears in the above-identified patent and that said Letters Patent is hereby corrected as shown below:

Title page,
Item [56], References Cited, OTHER PUBLICATIONS, please delete "Bussey H E et al: "Service Architecture, Prototype Description, And Network Implications Of A Personalized Information Grazing Service" Multiple Facets of Integration, San Francisco, Jun. 3-7, 1990 Institute of Electrical and Electronic Engineers, pp. 1046-1053, XP000164339 see whole document" and insert instead -- K.L. Alexandrini, "A Look At Computer Graphics," Computer Teaching, pp. 23-25 (Feb. 1985) (abstract only) --;

Column 2,
Line 24, change "of.a" to -- of a --;

Column 9,
Line 5, delete the comma "," after "broadcast".

Signed and Sealed this

Thirtieth Day of March, 2004

JON W. DUDAS
*Acting Director of the United States Patent and Trademark Office*